Aug. 12, 1958     M. I. GLASS ET AL     2,846,921
DEVICE FOR SELECTIVELY FORMING VARIOUS PICTORIAL
REPRESENTATIONS AND FOR PROJECTING
SAME ON A VIEWER Filed July 16, 1956     7 Sheets-Sheet 1

INVENTORS.
Marvin I. Glass
Howard E. Morris
Henry A. Goldsmith
BY
May R. Fraus
Attorney.

Aug. 12, 1958 M. I. GLASS ET AL 2,846,921
DEVICE FOR SELECTIVELY FORMING VARIOUS PICTORIAL
REPRESENTATIONS AND FOR PROJECTING
SAME ON A VIEWER
Filed July 16, 1956 7 Sheets-Sheet 2

INVENTORS
Marvin I. Glass,
Howard E. Morris.
BY Henry A. Goldsmith
Max P. Kraus
Attorney.

Aug. 12, 1958  M. I. GLASS ET AL  2,846,921
DEVICE FOR SELECTIVELY FORMING VARIOUS PICTORIAL
REPRESENTATIONS AND FOR PROJECTING
SAME ON A VIEWER
Filed July 16, 1956  7 Sheets-Sheet 4

INVENTORS
Marvin I. Glass
Howard E. Morris
BY Henry A. Goldsmith
May R. ______
Attorney.

Aug. 12, 1958    M. I. GLASS ET AL    2,846,921
DEVICE FOR SELECTIVELY FORMING VARIOUS PICTORIAL
REPRESENTATIONS AND FOR PROJECTING
SAME ON A VIEWER
Filed July 16, 1956    7 Sheets-Sheet 6

INVENTORS
Marvin I. Glass
Howard E. Morres
Henry A. Goldsmith
BY
Mary R. Kraus
Attorney.

United States Patent Office 2,846,921
Patented Aug. 12, 1958

2,846,921

DEVICE FOR SELECTIVELY FORMING VARIOUS PICTORIAL REPRESENTATIONS AND FOR PROJECTING SAME ON A VIEWER

Marvin I. Glass, Howard E. Morris, and Henry A. Goldsmith, Chicago, Ill.; said Morris and said Goldsmith assignors to said Glass Application July 16, 1956, Serial No. 598,119

9 Claims. (Cl. 88—27)

This invention relates to a device for selectively forming various pictorial representations and for projecting same on a viewer.

One of the objects of this invention is to provide a device for selectively forming a large variety of different composite pictorial representations, including caricatures, comics and the like and for projecting same in enlarged form on a viewer.

Another object of this invention is to provide a device having a plurality of picture discs, each disc having a series of partial pictures so arranged that when the discs are properly aligned a complete or composite picture is formed which is projected on a viewer, thus permitting various combinations of composite pictures to be formed.

Another object is to provide a viewing device supporting a plurality of rotatable discs, each disc having a plurality of spaced different pictorial representations arranged in concentric bands with a different radius for each band so that when the pictorial representations on the bands of the same radius are aligned they will form a composite picture, said discs being movable to align any of said bands with the lens and light source to present the composite pictorial representations of any of said bands on the viewer.

Another object of this invention is to provide a device of the foregoing character with means for projecting the pictorial representations in color and for permitting said pictorial representations to be traced.

Another object of this invention is to provide a device which will afford entertainment and play value for children and which is educational.

Other objects will become apparent as this description progresses.

The device as best shown in Figs. 1 to 4 comprises a stand or support generally indicated at 20 which has a rear section 22, a longitudinal intermediate member 24 and a front upright portion 26. The rear section has a horizontal base 28 provided with a front transverse vertical wall 30 and a vertical outer side wall 32. The front transverse vertical wall 30 has an enlarged opening 34 and extending forwardly of said opening and surrounding same is an annular rim 35 which is secured to the transverse wall.

Secured to the front end of the annular rim 35 is a hollow truncated cone shaped member 36. The rear end of the cone shaped member 36 is cylindrical as at 37 and is secured to the rim 35. The front end of the cone member 36 is secured to a viewer housing generally indicated by the numeral 38. The viewer housing 38 is supported on the front upright portion 26. The top of the upright portion 26 being substantially V-shaped to support the viewer housing.

The viewer housing 38 has a rear end wall 40 (Fig. 4) with an enlarged opening 41 to receive the front end of the cone shaped member 36. Said viewer housing has an inclined bottom wall 42 with one end 43 thereof at right angles to the rear end wall 40. The inclined bottom wall 41 connects with a short front end wall 44. The opposite side walls 45 and 46 complete the viewer housing.

The top of the housing has secured to it a plate 47 provided with an enlarged circular opening 48. The plate has an annular groove 49 adjacent said opening on which is permanently secured a disc 50 having a frosted surface. The top of the disc 50 being flush with the top of the plate 47 so that a sketch paper may be placed thereon.

Figure 1:
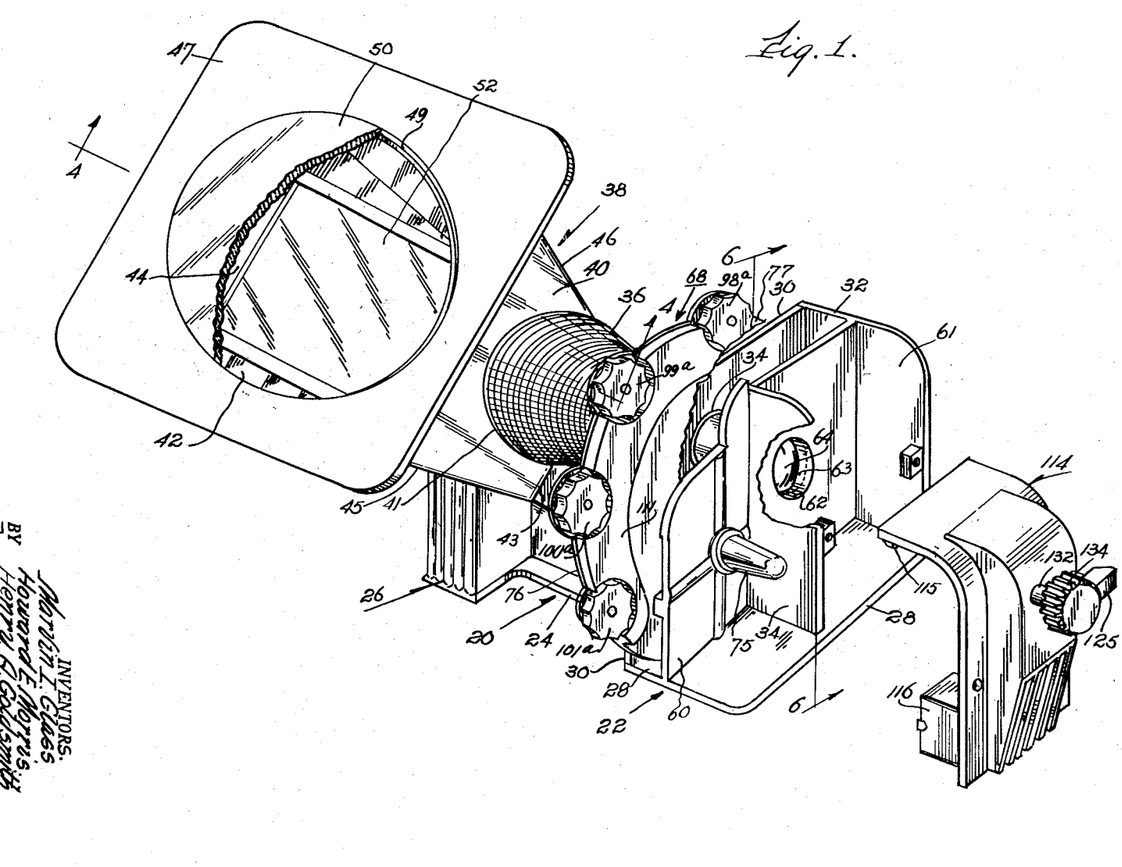
Fig. 1 is a front perspective view of the device with the rear cover member in separated position.
Figure 2:
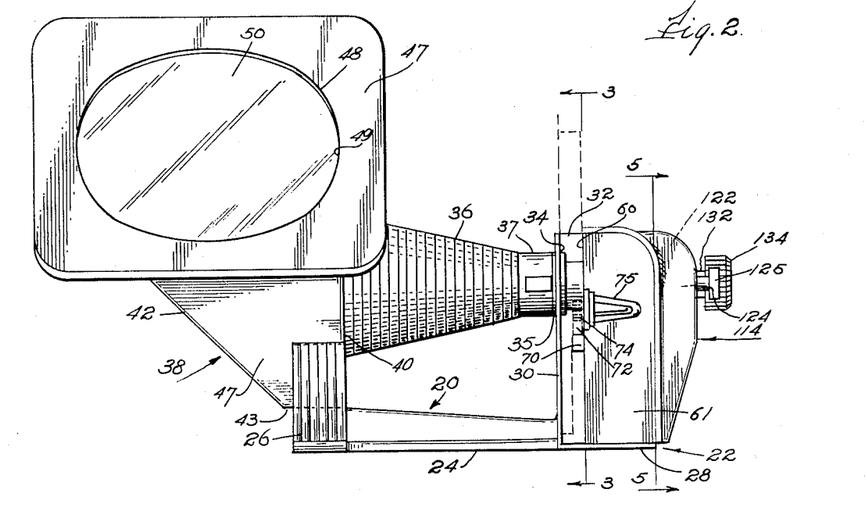
Fig. 2 is a side elevational view of the device with the picture holder removed.
Figure 3:
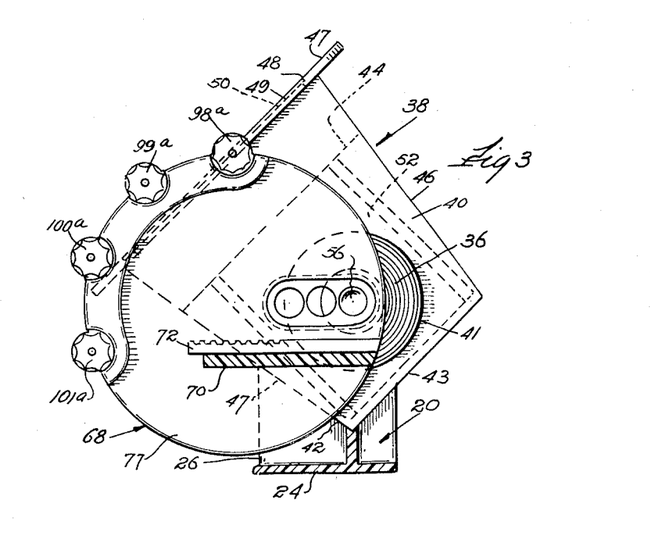
Fig. 3 is a detailed sectional view on lines 3—3 of Fig. 2 with the picture holder in position.

The bottom wall 42 of the viewer housing is inclined at 45° and supports on the inside of the housing a mirror 52 for the purpose of reflecting the image as will be described. The entire viewer housing is positioned so that the top thereof is inclined at approximately 45° to the longitudinal axis of the unit as best seen in Figs. 1 and 3.

Figure 4:
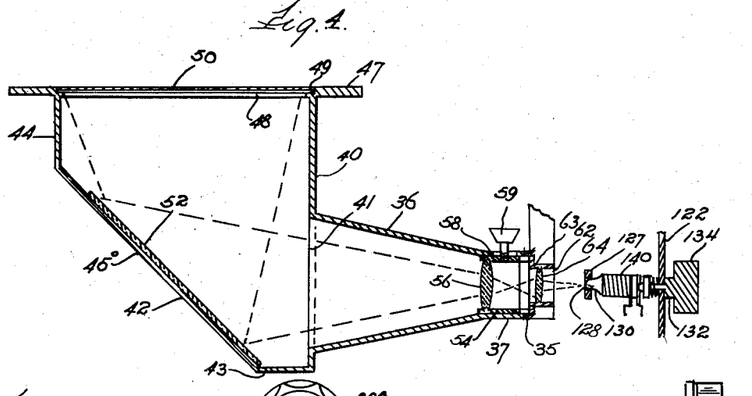
Fig 4 is a longitudinal section taken on lines 4—4 of Fig. 1.
Figure 5:
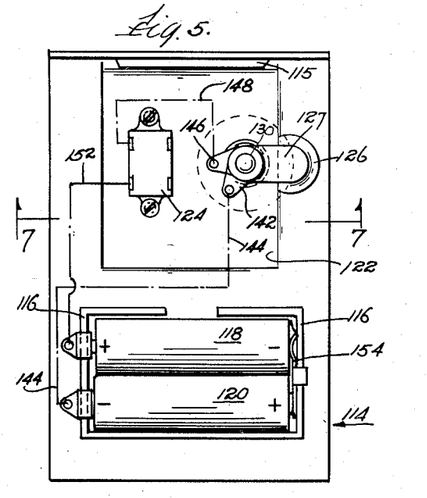
Fig. 5 is an inside view of the cover member.
Figure 6:
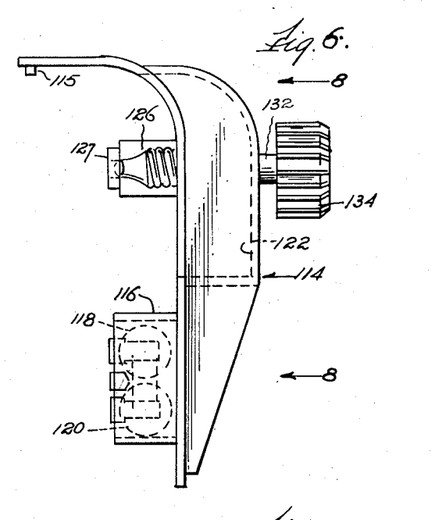
Fig. 6 is a side elevational view of Fig. 5.
Figure 7:
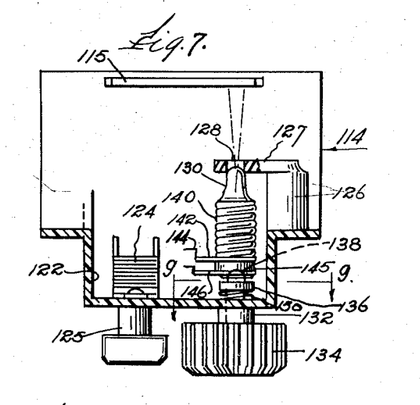
Fig. 7 is a detail sectional view on lines 7—7 of Fig. 5.
Figure 8:
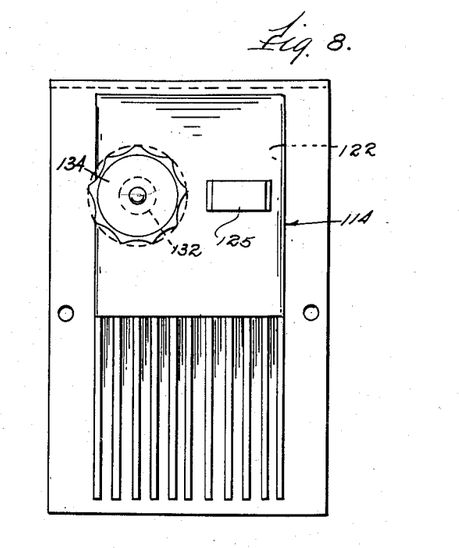
Fig. 8 is a view taken on lines 8—8 of Fig. 6.
Figure 9:
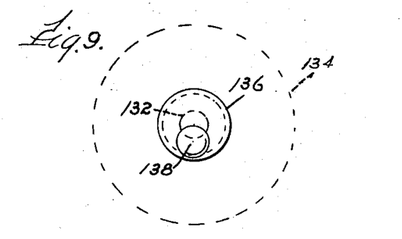
Fig. 9 is an enlarged detail on lines 9—9 of Fig. 7.
Figures 10, 11:
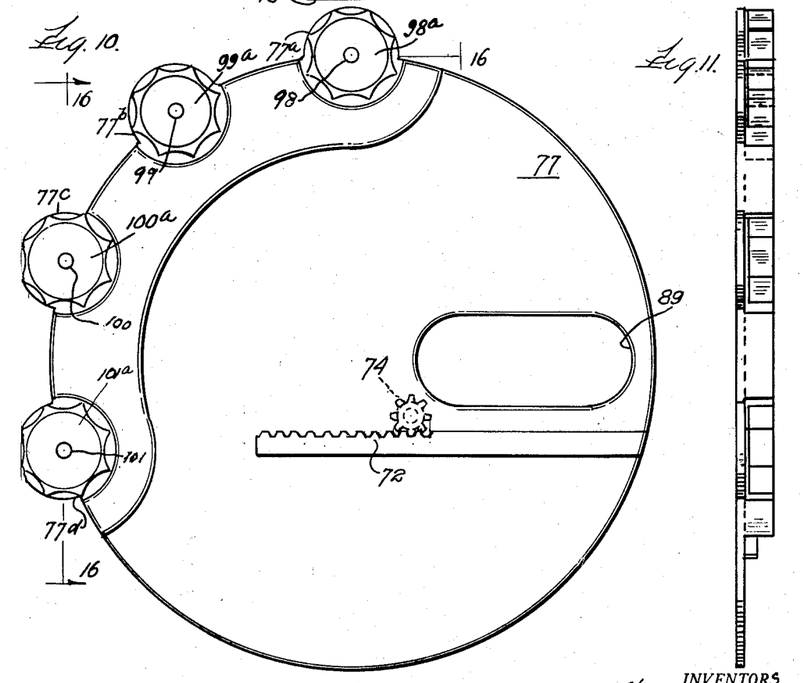
Fig. 10 is an outside plan view of the rear plate of the picture holder.
Fig. 11 is an edge view of Fig. 10.
Figures 15, 16, 17:
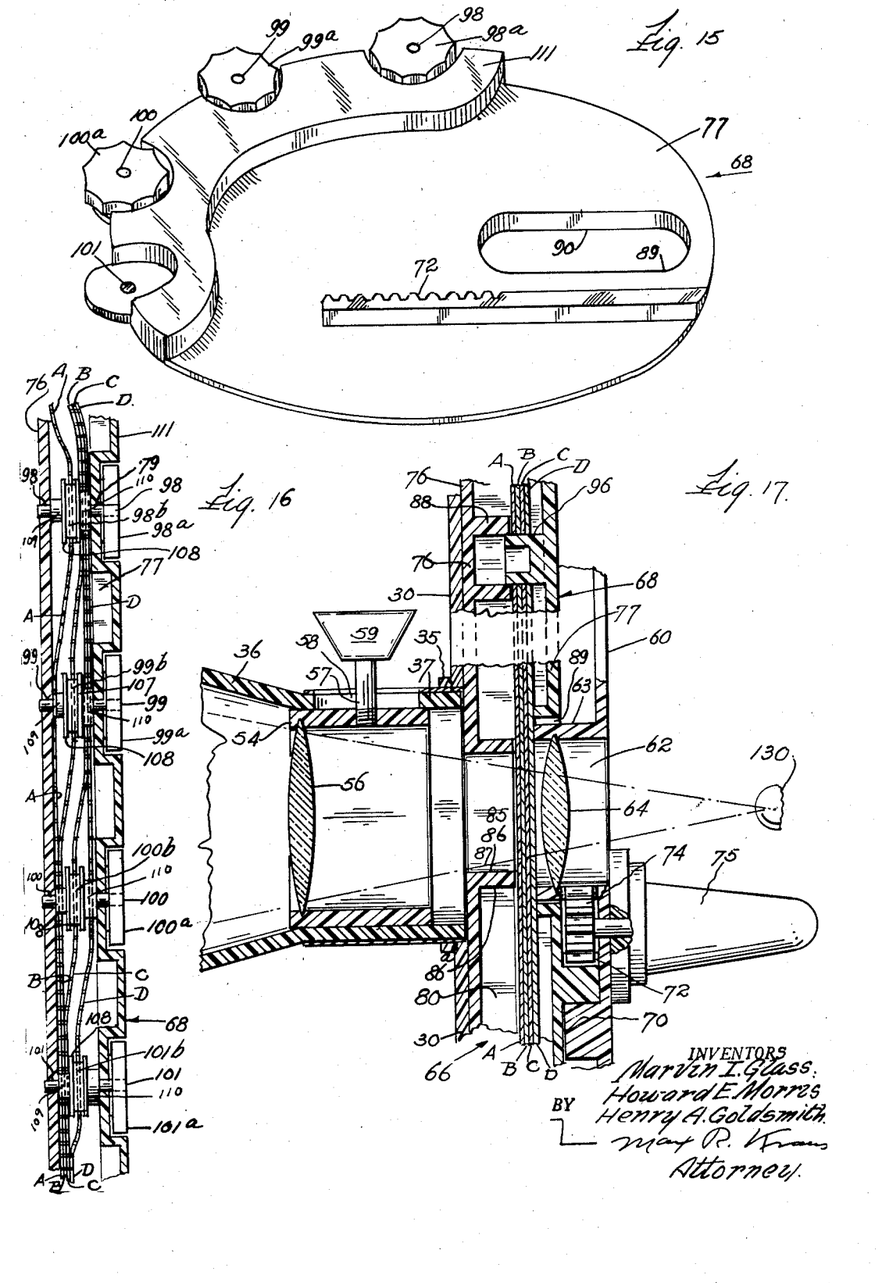
Fig. 15 is a perspective of the outside of the rear plate of the picture holder.
Fig. 16 is a detail section taken on lines 16—16 of Fig. 10 showing the arrangement of the picture disc.
Fig. 17 is an enlarged fragmentary view showing particularly the lenses and the picture discs in the picture holder.

As best seen in Figs. 4 and 17 slidably secured within the cylindrical portion 37 of the cone 36 is a sleeve 54 which supports within it at the front thereof a magnifying lens 56. A stem 57 is secured to the sleeve 54 and extends through a longitudinal slot 58 in the cylindrical portion 37 of the cone. A manually engageable knob 59 is secured to said stem for the purpose of sliding the sleeve 54 to adjust the lens with respect to a condensing lens to be described for the purpose of focusing the image.

Suitably secured to the vertical side wall 32 in spaced relation to the transverse wall 30 and rearwardly thereof is a rear transverse wall 60 (Fig. 17) which has an annular opening 62 surrounded by a rim 63 extending forwardly thereof within which is secured a condensing lens 64. The condensing lens 64 being in axial alignment with the magnifying lens 56. The condensing lens 64 being in a stationary position while the magnifying lens 56 is axially slidable relative thereto. The space 66 between the front transverse wall 30 and the rear transverse wall 60 is for the purpose of accommodating a picture holder generally indicated at 68 and to be subsequently described.

The rear transverse wall 60 has a longitudinal rib 70 on which rests the rack 72 of the picture holder 68 for supporting said picture holder. The rear transverse wall 60 supports a rotatable pinion 74 which is manually rotated by a knob 75 extending rearwardly of the transverse wall 60. The pinion 74 is in engagement with the rack 72 for moving the picture holder laterally on the rib 70.

Figure 13:
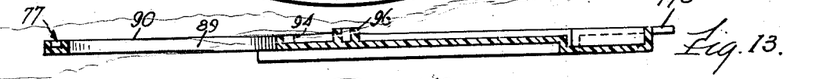
Fig. 13 is a detail sectional view on lines 13—13 of Fig. 12.
Figure 14:
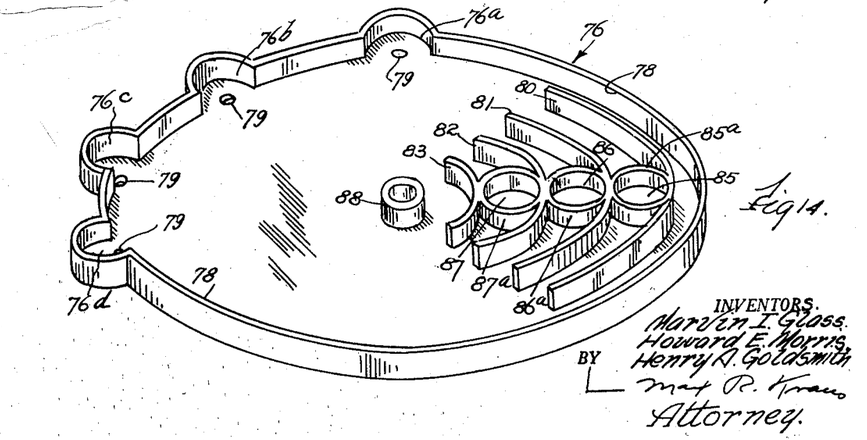
Fig. 14 is a perspective of the inside of the front plate of the picture holder.

The picture or film disc holder 68 (Figs. 12, 13 and 14) is a housing formed of two annular plates 76 and 77 which are secured together with the picture discs rotatably secured therein. The annular front plate 76 best shown in Fig. 14 is a disc which has 4 arcuate shaped extensions or ears 76a, b, c, d and has an outer annular peripheral flange 78 which continues around said ears. Each of the said ears has an opening 79 to receive the end of the stub shafts on which are mounted the pinions for rotating the picture discs. The interior of the front plate 76 is provided with four arcuate shaped segmental ribs 80, 81, 82 and 83 which are spaced from each other.

Three openings 85, 86, and 87 are provided in said plate between the segmental ribs and said openings are on a line at substantially right angles to the diameter of the plate, taken on the line coincident with the opening 79 of ear 76a. The openings are each surrounded by an annular rib 85a, 86a and 87a respectively, the tops of which are flush with the segmental ribs. A hub 88 is provided.

The rear plate 77 (Fig. 12) has an elongated opening 89 surrounded by a raised flanged border 90 and extending from the opposite sides of said opening on the inner side of said plate are arcuate shaped segmental ribs 91, 92 and 93 similar to the ribs 80, 81, 82 and 83 previously described and which are in alignment herewith when the discs are secured together. The elongated opening 89 of the rear plate 77 will then be in alignment with the three openings 85, 86 and 87 of the front plate 76. The rear plate 77 is provided with a hub 96 which fits partially into the hub 88 of the front plate. The rear plate 77 is provided with 4 arcuate shaped ears 77a, 77b, 77c and 77d arranged complementally to the ears 76a, b, c and d of the front plate and each ear has an opening 97 which receives one end of a rotatable stub shaft.

When the front and rear plates 76 and 77 are secured together a stub shaft will be secured in each of the aligned openings 79 and 97 and each shaft fixedly support a pinion. The stub shafts (Figs. 15 and 16) are identified by the numerals 98, 99, 100 and 101 and each has fixedly secured thereto a pinion identified respectively at 98b, 99b, 100b and 101b. A portion of each of the pinions being positioned within the ear portion of the plates with the teeth of said pinions engaging the peripheral teeth of the picture discs to be described. The pinions (Fig. 16) are fixedly secured to their respective stub shafts and are positioned between a pair of small discs or washers mounted on the stub shafts. The washers have all been identified by the numerals 107 and 108 and serve to guide the film discs. All of the front washers 108 are spaced from the inner wall of the front plate 76 by a spacer member 109 secured on the stub shafts so that all of the pinions are mounted on the same vertical plane. All of the rear washers 107 are spaced from the inner wall of the rear plate 77 by a spacer member 110 secured on the stub shafts.

Each stub shaft has fixedly secured to the outer end thereof a manually engageable knob which is supported externally and rearwardly of the rear plate. The four knobs each being identified by the same numeral as the stub shaft on which it is mounted followed by the letter a. The outside of the rear plate 77 has an arcuate shaped raised portion 111 which has recesses to accommodate the knobs so that the outer wall of the knobs is flush with the raised portion 111 as best shown in Figs. 15 and 16.

Figure 12:
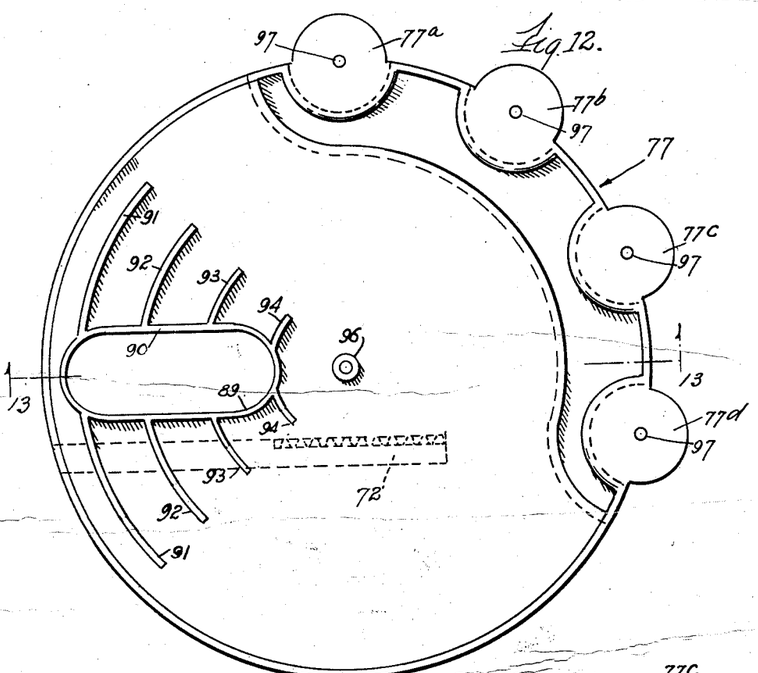
Fig. 12 is an inside plan view of the rear plate of the picture holder.
Figures 18, 19, 20, 21:
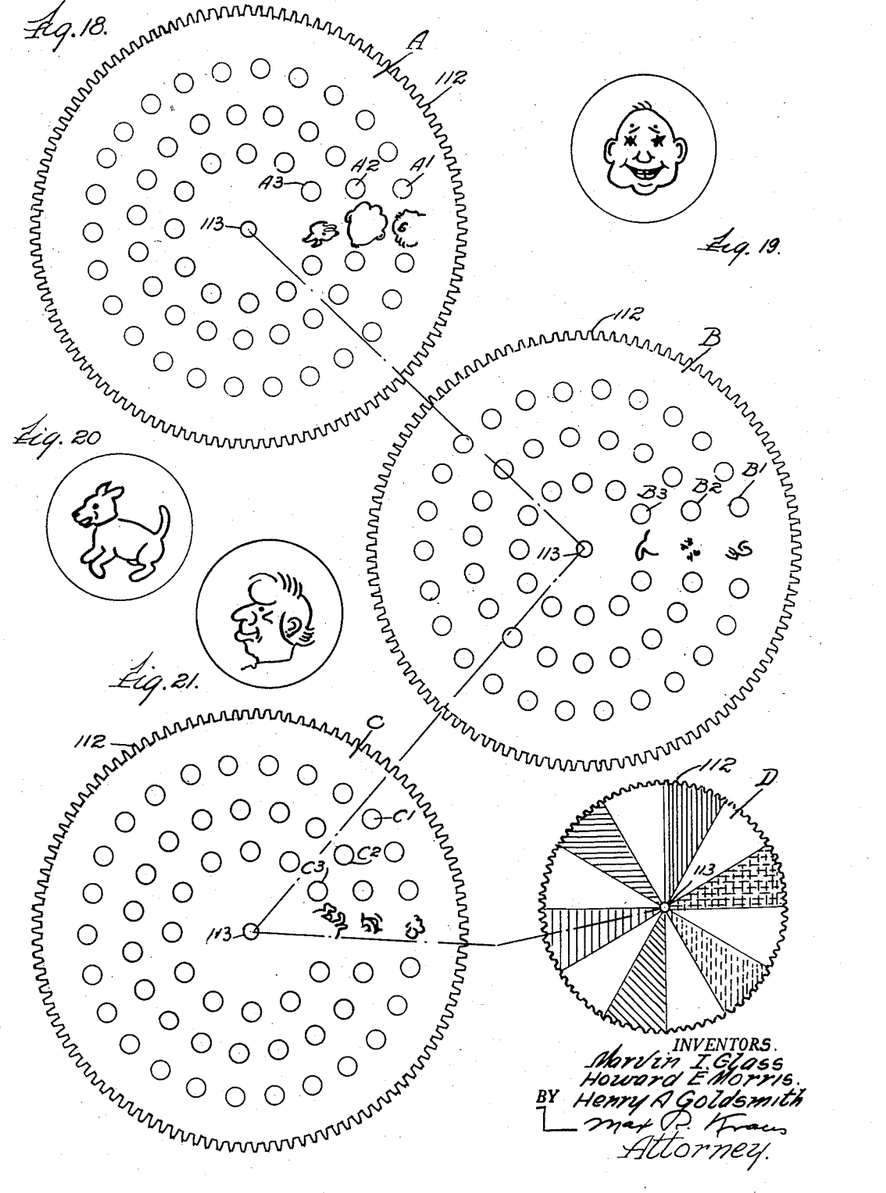
Fig. 18 is a group view of the picture disc including the color disc.
Fig. 19 is a view of one of the composite pictures in full face.
Fig. 20 is a view of one of the composite pictures of the animals.
Fig. 21 is aview of one of the composite pictures in profile.

The 3 picture discs which are shown in plan in Fig. 18 and identified by the letters A, B, and C are all of equal size and while disc D which is the color disc is shown of smaller size it is of the same size as the others. Each disc is provided with teeth 112 extending around the entire periphery of the disc for engagement with its respective operating pinion. Each disc has an axial opening 113 and is rotatably supported on the hub 96 of the real plate 77 (Fig. 12). The picture discs and color disc are positioned in superimposed or contiguous relationship and are rotated to align with the elongated opening 89 in the rear plate 77 and the three openings 85, 86 and 87 in the front plate 76. The discs A, B, C and D are of a flexible nature, consequently they can be flexed or bent to engage their respective operating pinion and avoid engagement with the 3 remaining pinions. The discs are supported inside the housing and are positioned between the segmental ribs 80, 81, 82 and 83 and the segmental ribs 91, 92, 93, and 94 so that that portion of the discs which are aligned with the elongated opening 89 and circular openings 85, 86 and 87 are perfectly flat to insure a clear undistorted picture. It will be noted that the interior of the housing adjacent the pinions has no ribs consequently the discs may flex slightly for the purpose of engaging their respective operating pinion and override the other pinions as will now be described.

For example picture disc A which is positioned adjacent the front plate 76 engages the top pinion 98b operated by knob 98a. The picture disc A is retained between the washers 107 and 108 on the stub shaft 98. It does not engage the remaining pinions but is flexed slightly to ride in spaces between front plate 76 and the front washers 108 of the 3 remaining pinions.

Picture disc B which is positioned adjacent film A engages the second pinion 99b and is retained between the washers 107 and 108 on shaft 99. It does not engage the remaining three pinions but is flexed slightly to ride the space between the rear washer 107 and the inner wall of the rear plate 77 adjacent the first stub shaft 98 and the space between the front plate 76 and front washers 108 adjacent the third and fourth stub shafts 100 and 101.

Picture disc C which is positioned adjacent film B engages the third pinion 100b and is retained between the washers 107 and 108 on shaft 100. It does not engage the remaining three pinions but is flexed slightly to ride in the space between the rear washers 107 and the inner wall of the rear plate 77 adjacent the first two stub shafts 98 and 99 and the space between the front plate 76 and front washer 108 adjacent the fourth stub shaft 101.

Color disc D which is positioned adjacent disc C engages the fourth pinion 101D and is retained between washers 107 and 108 on shaft 101. It does not engage the remaining three pinions but is slightly flexed to ride in the space between the rear washers 107 and the rear plate 77 adjacent the first three stub shafts 98, 99 and 100.

It will be seen that each disc is positioned to be operated by a single pinion and is flexed out of engagement with the remaining pinions. That insofar as the pinions it does not engage, each disc is flexed so that the portion of the disc positioned above the pinion it engages, is positioned between the rear plate 77 and rear washer 107 and that portion of the disc below the pinion it engages passes between the front washer 108 and the front plate 76.

The rim portion 63 (Fig. 17) supporting the condensing lens 64 is positioned in the elongated slot 89 of the rear plate 77 of the picture holder 68. Rotation of the pinion 74 by the knob 75 will move the picture holder 68 in either direction, it being stopped by engagement of the rim portion 63 engaging the opposite ends of the elongated slot 89. By rotating the knob 75 the picture holder is moved horizontally so that any of the three openings 85, 86 and 87 in the front of the picture holder is brought into alignment with the lenses so that the picture formed in said openings may be projected. The rear transverse wall 60 has a rearwardly extending horizontal wall below the lenses and a side wall 61.

A rear cover member (Figs. 1 and 5 to 8) generally indicated at 114 has a forwardly extending horizontal portion which has pins 115 which engage the rear transverse wall 60 whereby same is detachably secured to the rear transverse wall 60. It is positioned between side walls 34 and 61. The inside of said cover member has a rectangular shaped frame 116 adjacent the bottom thereof in which are secured a pair of small dry cell batteries 118 and 120. Said cover member has a recessed portion 122 in which is secured a switch member generally designated at 124. Said switch member is operable by a switch lever 125 extending rearwardly through an opening in the cover.

Secured adjacent one side of said covers (Fig. 7) is a forwardly extending post 126 which supports a transverse strip 127 having an opening 128 to accommodate the front end of a small electric spotlight or pen light bulb 130. The removable cover 114 supports a stub shaft 132 on the outer end of which is fixedly secured a manually rotatable knob 134. The inner end of the shaft 132 has fixedly secured to it a small disc 136 which has secured to it in off center relationship a forwardly extending pin 138. A metal threaded sleeve 140 receives the light bulb 130. The rear end of the sleeve 140 is closed by a contact element 142 which is connected by a conducting wire 144 to the negative side of the dry cell 120. Also supported by said sleeve 140 is another contact element 146 which is insulated from the first contact element by a fiber washer 145. Said second contact element 146 is connected by a conducting wire 148 to one terminal of the switch 124. The rear of the contact element 146 has a socket shaped end to receive the pin 138. A coiled spring 150 is mounted on the stub shaft 132 between the wall of the cover and the disc 136, its forward thrust by pushing the bulb assembly against hole 128 in strip 127 will secure the light bulb in position. Rotating the knob 134 will move the rear of light bulb into a proper position so that the beam of light will be projected in correct relationship with the two lenses 64 and 56.

A conducting wire 152 connects the positive terminal of dry cell 118 to the other terminal of switch 124. A contact element 154 connects the opposite positive and negative terminals of the dry cell batteries. The switch lever 125 is manually actuated to close and open the circuit for the purpose of causing the light bulb 130 to go on and off as desired.

The four discs A, B, C and D which are rotatably supported in the picture holder as previously described will now be described in detail. The discs A, B and C each contain 3 concentric annular bands or tracks and each band or track bears characters or pictorial representations representing a portion of a complete pictorial representation. As shown the 3 annular bands or tracks of disc A are designated as A1, A2 and A3. The three annular bands or tracks of disc B are designated as B1, B2, and B3 and the three annular bands or tracks of disc C are designated as C1, C2 and C3. The discs are positioned adjacent each other in contacting relation inside the film holder and are mounted to rotate on the hub of the holder. The outer concentric bands of each disc, namely, A1, B1 and C1 are on substantially the same radius. The intermediate concentric bands, namely, A2, B2 and C2 of the 3 discs are on substantially the same radius and the inner concentric bands namely A3, B3 and C3 are on substantially the same radius so that when properly aligned with their respective opening in the picture holder they will present a complete pictorial representation. Each band or track comprises a series of pictorial representations concentrically arranged in spaced relation. Each pictorial representation on each band is different than any other pictorial representation on the same band. For example, each of the circles of the discs A, B and C shown in Fig. 18 represents a different pictorial representation and an endless number of various combinations of completed pictorial representations may be formed and projected. For example the single characteristics or pictures on the three outer bands A1, B1 and C1 when properly aligned will form a face and head in profile, thus each pictorial representation on band A1 will be a different partial representation of part of the head, namely, a series of different representations of the back of heads, while band B1 will carry a series of representations of different noses in profile and band C1 will carry a series of representations of different mouths and chins in profile. Thus when the 3 discs are rotated by their respective knobs 98a, 99a and 100a and are properly aligned in the opening 85 of the picture holder a complete representation of the face and head in profile is formed, one of which is shown in Fig. 21. By rotating the discs with respect to each other a large number of other combinations are presented, thus a large variety of different heads and faces in profiles are capable of being formed merely by rotating the discs.

The intermediate bands A2, B2 and C2 of the 3 discs likewise each contain a portion of a complete pictorial representation. For example band A2 contains a series of different facial outlines in full face. Intermediate band B2 will contain a series of eye representations for a full face and intermediate band C2 will contain a series of mouths for a full face and when aligned with the opening 86 in the picture housing a large variety of facial expressions in full face view are visible, one of which is shown in Fig. 19.

The three inner concentric bands A3, B3 and C3 of the three discs are used to form caricatures of animals, grotesque or otherwise. Band A3 contains a series of heads, band B3 contains a series of hind quarters and tails and band C3 contains a series of bodies and lower limbs, thus various combinations of animals are capable of being formed when aligned with the opening 87 in the picture housing, one of which is shown in Fig. 20.

The pictorial representations on the outer bands A1, B1 and C1 are always in radial alignment with outer opening 85 of the picture housing. The pictorial representations on the intermediate bands A2, B2 and C2 are always in radial alignment with the intermediate opening 86 in the picture housing and the inner bands A3, B3 and C3 of the pictorial representations are always in radial alignment with the inner opening 87 of the picture housing. To present the pictorial representations of any of the bands it is necessary to move the film holder laterally so that the respective opening either 85, 86 or 87 is in alignment with the lenses 56 and 64. Rotating the knob 75 will rotate the pinion 74 in engagement with the rack 72 to move the picture holder laterally for such purpose. When any of the above openings of the picture holder are in alignment with the lenses the discs are individually rotated to effect the various pictorial combinations.

Disc D is a color disc and is divided into a series of segments with certain of the segments bearing a different color and the alternate segments being uncolored or in white. Each of the segments can be aligned with the openings 85, 86 and 87 and will simultaneously embrace all of the three openings in the picture holder. By rotating the knob 101a the desired color is in registry with the lenses, for example if the segment with the blue color is aligned with the lenses the 3 openings of the picture holder are within the range of the segment so that whichever of the openings 85, 86 or 87 is aligned with the lenses the color blue is in registry therewith and the pictorial representation projected on the viewer will be in a blue tint. By rotating the color disc the other colors may be presented or the picture may be presented uncolored as when any of the uncolored segments are in alignment with the lenses.

The three discs A, B and C are each in the form of a transparency on which has been printed by photographic or mechanical means the characters or pictorial representations. Such means include lithographing, gelatin process, printing or silk screen printing. We have found that photographic film printed as a positive representation serves admirably for the purpose intended. The same is equally true of disc D.

The beam from the light bulb 130 will be condensed by the condensing lens 64 and the pictorial representation on the discs will be magnified by the projecting lens 56 and projected on the mirror surface 52 of the viewer where same is visible by looking through the frosted disc 50. If desired a sheet of tracing paper may be placed on the frosted disc 50 and a sketch made of the image presented.

This device is very entertaining and will provide unlimited play value since an unlimited number of pictorial representations can be formed and projected for viewing.

It will be understood that various changes and modifications may be made from the foregoing without departing from the spirit and scope of the appended claims.

We claim:

1. In a device of the character described including a projection lens and a viewing screen positioned forwardly of said projection lens, a movable picture disc holder supported rearwardly of said projection lens, said holder comprising a pair of plates joined together to form a housing, a plurality of picture discs rotatably supported in said housing on a common axis, said plates of said housing each having an aligned opening, each picture disc having formed thereon a plurality of concentric bands of pictorial representations so that the pictorial representations of the bands having the same radius may be aligned to form a composite picture adjacent said aligned openings in said housing, means for moving said picture disc housing and picture discs as a unit to position any of said concentric bands of said picture discs in alignment with said projection lens, a light source positioned rearwardly of said picture disc housing and in alignment with said projection lens and adapted to project said composite pictures on said viewing screen, said picture disc housing having a plurality of manually rotatable members, each engaging one of said picture discs for rotating said picture discs with respect to each other.

2. In a device of the character described including a projection lens and a viewing screen positioned forwardly of said projection lens, a movable picture disc holder supported in relation to said projection lens, said picture disc holder comprising a plurality of plates joined together to form a housing, a plurality of picture discs rotatably supported in said housing on a common axis, one of said plates of said housing having a plurality of openings with each opening on a different radius with respect to said common axis, and the other of said plates having an elongated opening in alignment with and embracing said plurality of openings on said first mentioned plate, each picture disc having formed thereon a plurality of pictorial representations arranged in a plurality of concentric bands so that the pictorial representations of the respective bands having the same radius may be aligned to form a composite picture adjacent the opening on the same radius of said first mentioned plate, means for moving said picture disc housing and discs as a unit to position any of the openings of said first mentioned plate in alignment with said projection lens, a light source positioned rearwardly of said picture disc housing and in alignment with said projection lens and adapted to project said composite pictures on said viewing screen, said picture disc holder having a plurality of manually rotatable members, each engaging one of said picture discs for rotating said discs with respect to each other.

3. In a device of the character described including a light source, a lens positioned forwardly of said light source, and a projection screen positioned forwardly of said lens, a picture disc holder supported in relation to said lens, said holder comprising a plurality of plates joined together to form a housing and having spaced openings arranged for alignment with said lens and said light source, a plurality of picture discs rotatably supported in said housing between said plates, said picture discs each having a plurality of spaced concentric bands of pictorial representations so arranged that the pictorial representations of the various bands of the same radius form a composite picture when in registry, said openings of said housing being in alignment with said bands, means for selectively moving said picture disc housing and said picture discs as a unit to align said picture disc housing openings and any of said concentric bands of pictorial representations with said lens so that the composite picture presented will be projected on said projection screen.

4. In a device of the character described including a light source, a lens positioned forwardly of said light source, and a viewing screen positioned forwardly of said lens, a picture disc housing positioned in relation to said projection lens, said picture disc housing provided with aligned openings, a plurality of picture discs wholly confined within said housing and rotatably supported on a common axis therein, each of said discs having a plurality of concentric bands of pictorial representations with said bands arranged on the same radius as said spaced openings so that the pictorial representations when aligned form a composite picture in said openings, means for moving said picture disc housing and picture discs as a unit to align any of said concentric bands of pictorial representations with said lens and light source to permit said composite pictures to be projected on said viewing screen, said picture disc housing having a plurality of manually rotatable members each engaging one of said picture discs for rotating said discs with respect to each other.

5. In a device of the character described including a light source, a lens positioned forwardly of said light source and a projection screen positioned forwardly of said lens, a picture disc housing having a pair of spaced front and rear walls, a plurality of circular openings in one of said walls, the other of said walls having an elongated opening in alignment with and encompassing said plurality of openings, a plurality of flexible picture discs rotatably supported wholly within said housing, each said picture discs having a plurality of spaced concentric bands of pictorial representations so arranged that the pictorial representations of the various bands of the same radius form a composite picture when in registry, one of each of said plurality of openings in said one wall of said housing being in alignment with one of each of the concentric bands, means for selectively moving said picture disc housing and said picture discs as a unit so that any one of said openings is aligned with the lens so that the composite picture presented will be projected on the projection screen.

6. In a device of the character described including a light source, a lens positioned forwardly of said light source and a projection screen positioned forwardly of said lens, a picture disc housing having a pair of spaced front and rear walls, a plurality of circular openings in one of said walls, the other of said walls having an elongated opening in alignment with and encompassing said plurality of openings, a plurality of flexible picture discs rotatably supported wholly within said picture disc housing, each said picture discs having a plurality of spaced concentric bands of pictorial representations so arranged that the pictorial representations of the various bands of the same radius form a composite picture when in registry, one of each of said plurality of openings in one wall of said housing being in alignment with one of each of the concentric bands, means for selectively moving said housing and said picture discs as a unit so that any one of said openings is aligned with the lens so that the composite picture presented will be projected on the projection screen, each said picture disc having peripheral teeth, a plurality of rotatable knobs supported on said housing adjacent the periphery of said discs, and each having means engaging one of said picture discs to permit each picture disc to be rotated with respect to the other.

7. In a film viewing apparatus comprising a base, an upright supporting member at the rear end of said base for supporting a film housing in a vertical position, a viewing housing supported at the front end of said base and provided with a reflecting surface, a housing horizontally positioned between said viewing housing and said rear upright supporting member, said viewing housing having a viewing screen at the top thereof and positioned so that said viewing screen is inclined approximately 45° to the longitudinal axis of the apparatus to support a sketch sheet, said film housing having aligned openings, a plurality of transparent film members wholly supported in said film housing and rotatably carried in said housing and having indicia thereon arranged in a plurality of concentric bands to be aligned with said film housing openings, means for rotating said transparent film members in said film housing to form a composite picture, a projecting system including a lens and light means for projecting the composite picture on said viewing screen, and means for shifting said film housing laterally to expose the indicia on any of said concentric bands for projection on said viewing screen.

8. In a film viewing apparatus comprising a base, an upright supporting member at the rear end of said base for supporting a film housing in a vertical position, a viewing housing supported at the front end of said base and provided with a reflecting surface, a housing horizontally positioned between said viewing housing and said rear upright supporting member, said viewing housing having a viewing screen at the top thereof and positioned so that said viewing screen is inclined approximately 45° to the longitudinal axis of the apparatus to support a sketch sheet, said film housing having aligned openings, a plurality of transparent film members wholly supported in said film housing and rotatably carried in said film housing and having indicia thereon arranged in a plurality of concentric bands to be aligned with said film housing openings, means for rotating said transparent film members in said film housing to form a composite picture, and a projecting system including a lens and light means for projecting the composite picture on said viewing screen.

9. In a film viewing apparatus comprising a base, an upright supporting member at the rear end of said base for supporting a film housing, a viewing housing supported at the front end of said base and provided with a reflecting surface, a housing horizontally positioned between said viewing housing and said rear upright supporting member, said viewing housing having a viewing screen at the top thereof and positioned so that said viewing screen is inclined approximately 45° to the longitudinal axis of the apparatus to support a sketch sheet, said film housing having aligned openings, a plurality of transparent film members wholly supported in said film housing and rotatably carried in said film housing and having indicia thereon arranged in a plurality of concentric bands to be aligned with said film housing openings, means for rotating said transparent film members in said film housing to form a composite picture, a projecting system including a lens and light means for projecting the composite picture on said viewing screen, said film housing having a plurality of rotatable members each engaging the periphery of one of said film members for separately rotating each said film member with respect to the other.

References Cited in the file of this patent

UNITED STATES PATENTS

| | | |
|---|---|---|
| 1,698,013 | DeZeng | Jan. 8, 1929 |
| 1,856,956 | Jordan | May 3, 1932 |
| 2,488,955 | Wood | Nov. 22, 1949 |
| 2,570,652 | Dilks | Oct. 9, 1951 |